(12) United States Patent
Dever et al.

(10) Patent No.: US 7,118,648 B2
(45) Date of Patent: Oct. 10, 2006

(54) PAPER STRAP

(75) Inventors: Edward Dever, Ponte Vedra, FL (US); Paul W. Weber, Old Town, FL (US)

(73) Assignee: SDF Group, LLC, Brillion, WI (US)

( * ) Notice: Subject to any disclaimer, the term of this patent is extended or adjusted under 35 U.S.C. 154(b) by 0 days.

(21) Appl. No.: 10/340,007

(22) Filed: Jan. 10, 2003

(65) Prior Publication Data

US 2004/0131825 A1 Jul. 8, 2004

Related U.S. Application Data

(60) Provisional application No. 60/438,911, filed on Jan. 8, 2003.

(51) Int. Cl.
*B32B 7/12* (2006.01)
*B32B 3/10* (2006.01)
*B31B 3/00* (2006.01)
*D21B 1/32* (2006.01)
*D21B 1/08* (2006.01)

(52) U.S. Cl. ............. 162/125; 162/132; 162/117; 162/127; 428/411; 428/532; 428/131; 428/156

(58) Field of Classification Search ........... 162/100, 162/4, 123, 135, 125, 132, 109; 428/211.1, 428/37, 32.21, 479.6, 478.8, 486, 537.5, 428/131, 121, 156, 343, 167, 182, 126, 129, 428/130; 53/399; 242/526.2
See application file for complete search history.

(56) References Cited

U.S. PATENT DOCUMENTS

| | | | |
|---|---|---|---|
| 2,461,246 A | 2/1949 | Weyenberg | |
| 2,499,463 A * | 3/1950 | Crary | 428/121 |
| 2,562,454 A * | 7/1951 | Grant | 493/399 |
| 2,766,925 A * | 10/1956 | Steen | 383/28 |
| 2,896,397 A * | 7/1959 | Steen | 57/259 |
| 3,126,312 A | 3/1964 | Nickerson | |
| 3,135,446 A | 6/1964 | Sargent | |
| 3,497,050 A | 2/1970 | Landgraf | |
| 3,552,101 A | 1/1971 | Papp | |
| 3,599,888 A | 8/1971 | Coudriet | |
| 3,759,262 A * | 9/1973 | Jones, Sr. | 604/365 |
| 3,765,615 A | 10/1973 | Brink et al. | |
| 3,836,095 A | 9/1974 | Kruhn | |
| 3,896,524 A * | 7/1975 | Parker | 24/17 B |
| 4,293,100 A | 10/1981 | Sharlow | |
| 4,335,858 A | 6/1982 | Cranna | |
| 4,358,979 A | 11/1982 | Kurzbuch | |
| 4,414,258 A * | 11/1983 | Corbin, Sr. | 428/193 |
| 4,659,029 A | 4/1987 | Rodriguez | |
| 5,022,316 A * | 6/1991 | Hellwig | 100/34 |
| 5,350,630 A * | 9/1994 | Schreiner et al. | 428/343 |
| 5,560,180 A | 10/1996 | Rodriguez et al. | |
| 5,737,903 A * | 4/1998 | Minutillo | 53/475 |
| 5,816,526 A * | 10/1998 | Bartelmuss et al. | 242/526.2 |
| 6,098,373 A * | 8/2000 | Ashikawa et al. | 53/381.2 |

(Continued)

*Primary Examiner*—Joseé A. Fortuna
(74) *Attorney, Agent, or Firm*—Hamilton & Desancts

(57) ABSTRACT

Among other things, the present invention provides various apparatus useful in paper manufacturing and recycling. On such apparatus is a paper strap that includes a paper body that is formed of a compound structure. Such a paper strap further includes an adhesive material formed on at least a portion of the paper body. Methods for using the paper strap include methods related to recycling paper products, methods for sealing cartons, and methods for manufacturing paper products.

22 Claims, 14 Drawing Sheets

U.S. PATENT DOCUMENTS

| | | | |
|---|---|---|---|
| 6,205,623 B1 * | 3/2001 | Shepard et al. | 24/30.5 R |
| 6,284,094 B1 * | 9/2001 | Carpenter et al. | 162/4 |
| 6,363,689 B1 | 4/2002 | Rodriguez et al. | |
| 6,416,604 B1 * | 7/2002 | Nootbaar et al. | 156/157 |
| 2002/0112456 A1 * | 8/2002 | Bartelmuss et al. | 53/589 |
| 2003/0235687 A1 * | 12/2003 | Peacock | 428/343 |
| 2004/0131825 A1 * | 7/2004 | Dever et al. | 428/131 |
| 2004/0200191 A1 * | 10/2004 | Armstrong et al. | 53/399 |

* cited by examiner

PAPER STRAP

CROSS-REFERENCES TO RELATED APPLICATIONS

The present application claims priority to U.S. Provisional Patent Application No. 60/438,911 entitled "Various Banding Apparatus and Methods for Using Such, filed on Jan. 8, 2003, and assigned to an entity common herewith.

BACKGROUND OF THE INVENTION

The present invention provides apparatus and methods related to manufacturing paper products and recycling paper products. More particularly, the present invention provides paper based banding products and methods for use thereof. The paper manufacturing industry processes pulp into paper products. This process can include the transfer of pulp to a paper manufacturer. The pulp is placed in a processing vat and reduced in preparation of making paper products. In some cases, this includes removing packaging materials that bind the pulp prior to placing the pulp in the vat. This is time consuming and wasteful.

There has been some progress in developing and using binding materials that can be placed in the vat along with the pulp. As one example, a twisted paper based strap has been used to bind the pulp. The binding includes placing the strap around the pulp, and the two ends of the strap are adhered one to another.

Further, the paper straps currently available exhibit significant liquid resistance that limits the rate at which the paper strap breaks down during the pulping process. Manufactured paper products can include paper based containers or cartons. Such cartons are used to contain a product for shipping, and can then be recycled after shipping. Often the materials used to secure such cartons must exhibit significant strength. For this reason, plastic and metal straps are often used. Use of such straps is problematic as the straps must be discarded, while the carton itself is recycled. This process of separating the recyclable materials from the non-recyclable materials is time consuming.

Thus, there exists a need in the art to address the various problems outlined above. As will be appreciated from the following disclosure, the apparatus and methods according to the present invention address these, and a number of other problems related to manufacturing paper products, using paper products, and/or recycling paper products.

BRIEF SUMMARY OF THE INVENTION

The present invention provides apparatus and methods related to manufacturing paper products and recycling paper products. More particularly, the present invention provides paper banding products and methods for use thereof.

Some embodiments of the present invention provide paper straps that include a paper body formed of a compound structure, and an adhesive material formed on at least a portion of the paper body. Such an approach eliminates the need to apply adhesive at the time the strap is used. This can reduce the amount of time required to strap a carton or bundle of pulp bales. Further, this can eliminate costly and inefficient clean-up that can occur where an external adhesive is used. In some instances, the compound structure is a folded structure, while in other instances the compound structure is a stringed and folded structure, a rippled structure, or a rippled and folded structure. As used herein, a folded structure includes a layered structure where the layers of the structure can be formed of a continuous paper material, or a non-continuous paper material such as discrete paper strips stacked one upon another. In various instances, the paper body consists essentially of virgin fiber. As such, a paper strap can be used in the paper manufacturing industry to make end products intended for human internal use, such as feminine napkins.

In some instances of the embodiments, the paper body is pulpable and/or exhibits very little liquid resistance. As such, the paper body can reduce relatively quickly in a paper manufacturing process. In some cases, the adhesive material is similarly pulpable and/or exhibits a relatively quick breakdown when placed in a liquid vat. For example, in one particular case, the adhesive material can comprise starch along with another adhesive. The adhesive material can be activated by one or more activators. Such activators can include, but are not limited to, heat activation, pressure activation, liquid activation, or any combination thereof. As an example, a pressure activation can result in the attachment of two ends of a paper strap, or of the paper strap to another surface, such as the surface of a carton. Similarly, liquid activation can include applying a small amount of liquid, such as water, upon which the strap is attached. Heat activation can include applying a heat source, such as an iron, whereby the adhesive is activated and the paper strap is attached.

In other embodiments of the present invention, methods of using a paper strap are provided. Such methods include providing a paper based carton and a paper strap. The paper strap is formed of a compound structure with an adhesive material formed on at least a portion of the paper body. The paper based carton is banded using the paper strap. Such banding includes touching a first end of the paper based strap to a second end of the paper based strap, and applying an adhesive activator.

Yet other embodiments of the present invention provide methods for recycling paper based cartons. The methods include receiving at least one paper based carton and at least one paper strap. The paper strap comprises a paper body formed of a compound structure, and an adhesive material formed on at least a portion of the paper body. The methods further include placing the paper based carton and the paper strap in a common recycling batch. As a further example, post consumer paper based waste can be banded in bundles using a paper based strap. Such paper based straps can be those in accordance with embodiments of the present invention. When the bundles are subsequently introduced into the recycling process, the paper based strap can remain, unlike metal and plastic straps in current use.

Additional embodiments provide methods for manufacturing paper products that include providing a plurality of pulp bales, and bundling the plurality of pulp bales using a paper strap. The paper strap includes a paper body formed of a compound structure with an adhesive material formed on at least a portion of the paper body. Yet further embodiments provide other methods for manufacturing paper products. Such methods include receiving a bundle of pulp bales that are banded by a paper strap. The paper strap includes a paper body, wherein the paper body is formed of a compound structure, and an adhesive material formed on at least a portion of the paper body. The bundle of pulp bales including the paper strap is placed into a pulper where the paper strap and the pulp bales form a portion of a manufactured paper product.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention provides an improved paper strap that can be used in, but is not limited to, strapping equipment in the packaging industry. As just some examples, the paper strap can be used for strapping pulp bales for use in the paper manufacturing industry and for strapping cartons used in shipping. In some cases, the paper strap is composed of biodegradable materials. In particular cases, the strap is made of materials that exhibit a relatively quick breakdown when placed in a pulping process, while in other cases, the straps are made from materials that are recyclable and reduce the amount of energy and/or time required in the recycling process.

Straps in accordance with the present invention are contrasted with prior art straps, such as plastic and metal straps. Such prior art straps require between eighty and four-hundred and fifty years to decompose in the environment. In contrast, the paper straps of the present invention can take a matter of only weeks to decompose. For example, one particular strap in accordance with the present invention decomposes in approximately eight weeks.

Further, a variety of prior art straps are tied using a metal band at the contact points of the strap. Such an approach requires removal of the metal prior to recycling, or introduction into a pulper (i.e., a vat or process used to convert pulp to paper products). In contrast, various embodiments of the present invention include an adhesive material formed on and inherent to the paper strap. Thus, no additional adhesive is required to adhere the strap. When ends of the paper strap are placed in contact, and an activator is applied, the paper strap forms a completed loop. In some cases, the activator is a high temperature source, a moisture source, a pressure source, and/or a combination thereof. In some cases, the adhesive is compatible with the pulping and/or recycling process. Thus, a carton or pulp bale bound by the paper strap can be recycled or introduced to a pulper along with the entire paper strap.

Figure 1A:
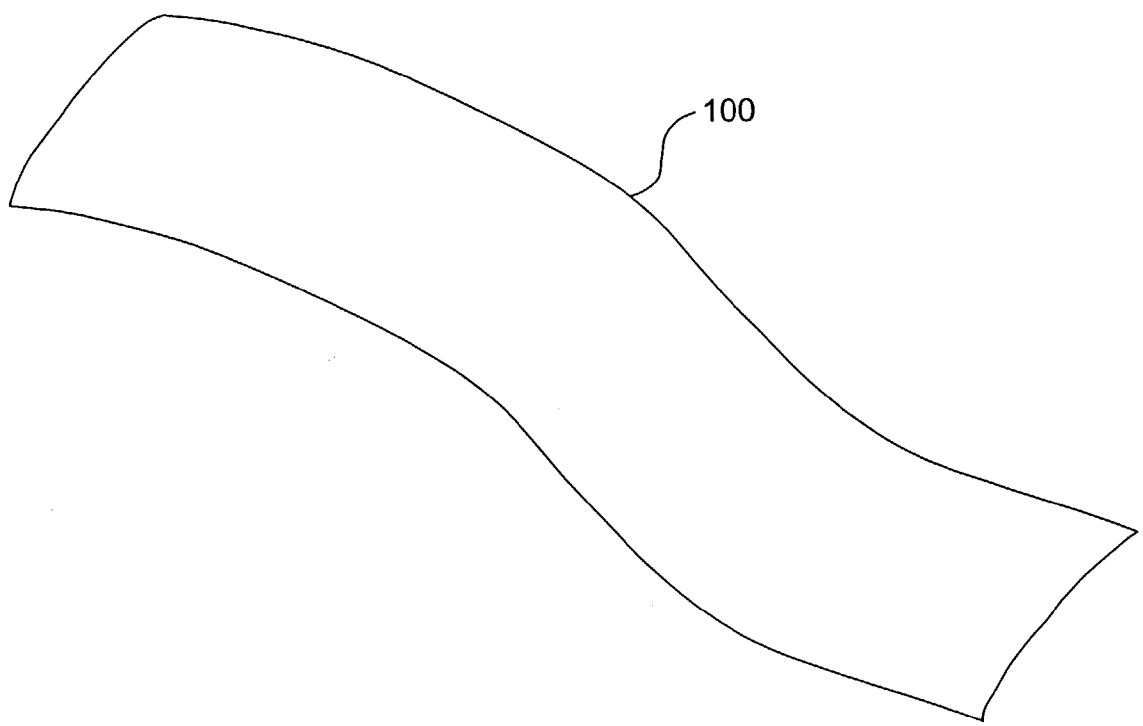
FIGS. 1a–1e illustrate a paper strap useful in relation to embodiments of the present invention.
Figure 1B:
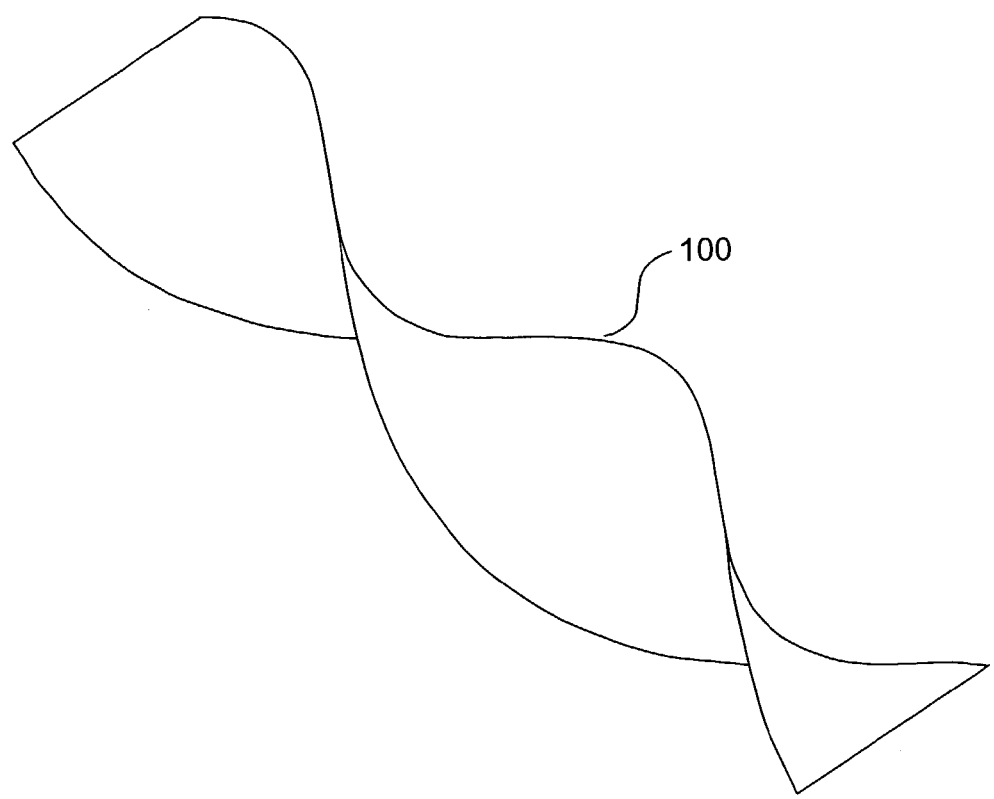
Figure 1C:
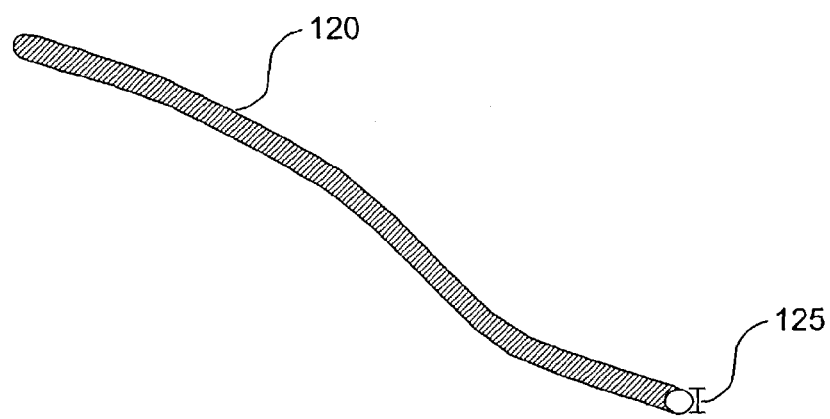
Figure 1D:
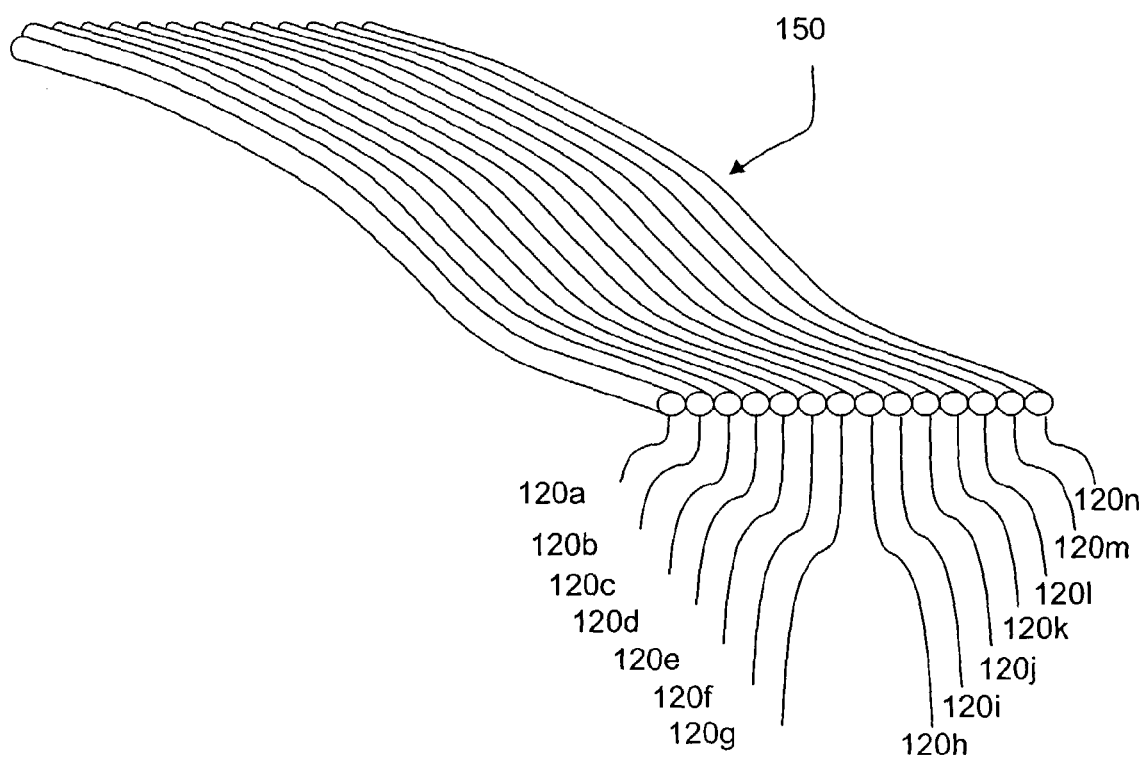

Referring to FIG. 1d, a prior art stringed paper strap 150 useful in relation to various embodiments of the present invention is disclosed. Stringed paper strap 150 is formed of a number of paper strips 100 that are twisted into paper stings 120, and then adhered to one another. FIG. 1a illustrates a paper strip 120 that is twisted as illustrated in FIG. 1b. The twisting process is continued until paper strip 100 is formed into a paper string 120 as illustrated in FIG. 1b. In one particular instance, paper string 120 is formed with a diameter 125 of approximately one to two millimeters in thickness. A number of paper strings 120 are attached using an adhesive to form a stringed paper strap 150 as illustrated in FIG. 1d. Again, stringed paper strap 150 without more is known in the prior art.

Figure 1E:
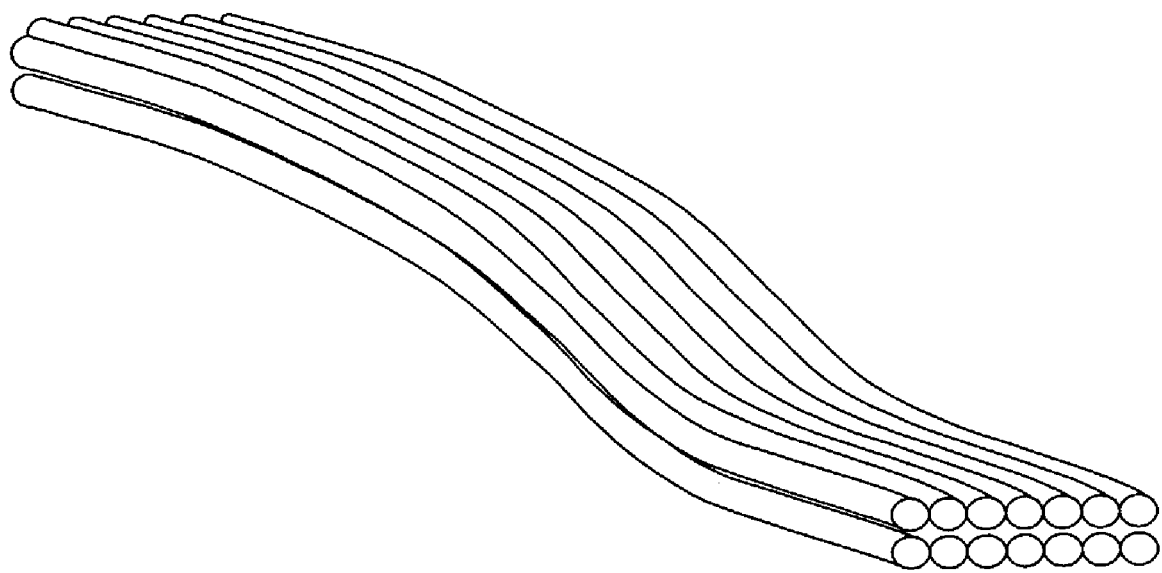

In accordance with some embodiments of the present invention, paper strips 100 can be formed of pulp. Thus, for example, where stringed paper strap 150 is destined to band pulp bales, it is of some advantage to user paper strips 100 that are formed of the same pulp that will be banded. This facilitates the pulping process where stringed paper strap 150 and a pulp bale that binds it are both introduced into a common pulping vat. In some embodiments of the present invention, stringed paper strap 150 is also folded over, and an adhesive applied to maintain the folded portions together. FIG. 1e illustrates one example of a stringed and folded paper strap 170 in accordance with various embodiments of the present invention. Such a stringed and folded structure is a compound structure as used herein. Further, as used herein, the term folded means one portion of a strap folded onto another portion of the strap, or two distinct strap portions layered onto one another. Both folding approaches provide roughly the same layering effect.

Stringed paper strap 150 and paper strap 170 can each be formed of biodegradable and/or repulpable materials. Thus, for example, paper strip 100, the adhesive(s) used to attach paper strings 120 to form stringed paper strap 150, and the adhesive(s) used to attach various layers of stringed and folded paper strap 170 can be biodegradable and/or repulpable. In some cases, the adhesive(s) used are water-soluble. Further, needling, or the addition of openings, can be used in accordance with embodiments of the present invention to increase exposed surface area of stringed paper strap 150. When the strap is placed in liquid, this increase in exposed surface area allows the liquid to more quickly break down the strap.

Figure 2A:
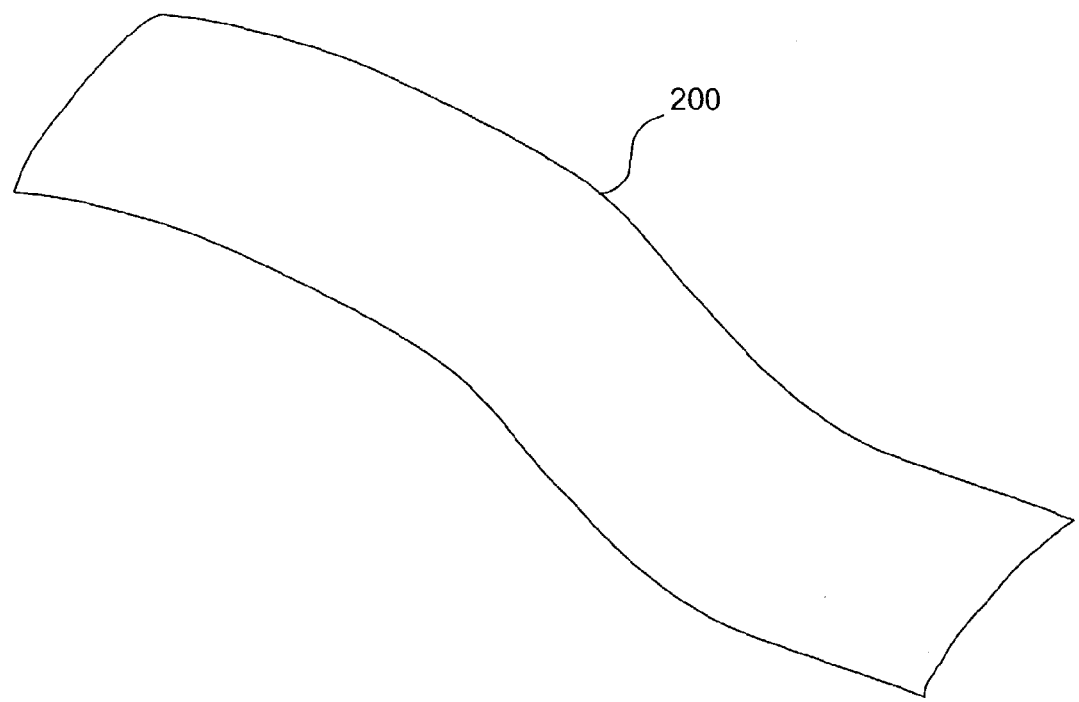
FIGS. 2a–2b illustrate an alternative paper strap useful in relation to embodiments of the present invention.
Figure 2B:
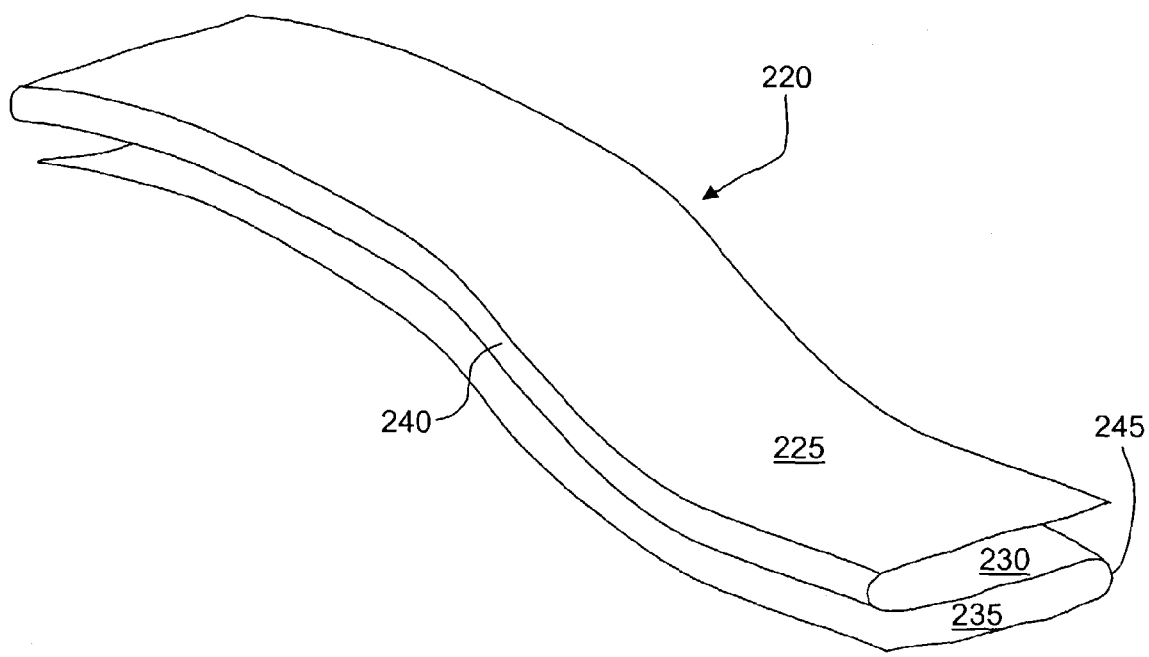

Referring to FIGS. 2a–2b, an alternative prior art folded paper strap 220 useful in relation to embodiments of the present invention is illustrated. Paper strap 220 is formed of one or more paper strips 200 that are layered, or folded, one onto another. In some cases, each of the layers are of substantially equal width, while in other cases, the layers are of differing widths. For example, the outer most layers may be wider than any inner layers, such that the outer layers fold around and encompass the inner layers. Paper strips 200 can be formed of pulp. Thus, for example, where folded paper strap 220 is destined to band pulp bales, it is of some advantage to user paper strips 200 that are formed of the same pulp that will be banded. This facilitates the pulping process where paper strap 220 and a pulp bale that binds it are both introduced into a common pulping vat.

As illustrated in FIG. 2b, paper strip 200 is twice folded over to create portions 225, 230, and 235. The stack of portions 225, 230, 235 forms the compound structure of the paper body of folded strap 220. Portions 225 and 230 are attached by fold area 240, and portions 230 and 235 are attached by fold area 245. In some instances, an adhesive can be placed between fold portions 225, 230, 235 to attach neighboring portions. For example, in one particular instance, the adhesive material is composed of starch. In other cases, the multiple adhesive materials are used with one being starch. Based on the disclosure provided herein, one of ordinary skill in the art will recognize a number of adhesive materials that can be used in conjunction with the present invention. Further, in some embodiments, folded paper strap is formed of distinct portions 225, 230, 235 that are not attached by fold areas 240, 245. Based on the disclosure provided herein, one of ordinary skill in the art will recognize that any number of portions 225, 230, 235 can be used where additional, or reduced strength of paper strap 220 is desired. Such a process can be used to form folded paper straps with a thickness of hundredths of millimeters to three millimeters or more. Indeed, it is conceivable that a strap could be of any thickness desired.

In particular embodiments of the present invention, folded paper strap 220 can be formed of biodegradable and/or repulpable materials. Thus, for example, paper strip 200, and the adhesive(s) used to attach portions 225, 230, 235 can be biodegradable and/or repulpable. Again, in some cases, the adhesive(s) used are water-soluble.

In one particular embodiment of the present invention, folded strap 220 is formed in part by folding over sides of paper strip 200, and additional layers are added thereto. Thus, for example, two or more folded paper straps 220 as illustrated can be stacked one upon another with an adhesive applied between to form the compound structure of the paper body.

For some applications, folded paper strap 220 is more advantageous than the previously described stringed paper strap 150. As one example, folded paper strap 220 offers greater repulpability. Said another way, stringed paper strap 150 will have a more difficult time breaking down. At least in part, this is because significant area of stringed paper strap 150 cannot be immediately exposed to the liquids involved in the paper manufacturing processes. Typically, paper strings 120 of stringed paper strap 150 must separate from each other, and then untwist in order to break down sufficiently to enter the manufacturing process. Further, the difficulty in breaking down stringed paper strap 150 can be related to the pulper temperature, residence time, pulper type and rotor type. Portions of stringed paper strap 150 that have not been sufficiently repulped, or broken down, can clog screens or enter the paper forming process and result in end product paper that is out of specification because of small fiber bundles in the end product. Where the pulper operates at lower temperatures, exhibits a short resident time, exhibits reduced mechanical energy, or has worn rotors, stringed paper strap 150 may limit repulpability. However, while folded paper strap 220 offers some advantages over stringed paper strap 150, stringed paper strap 150 still is a viable strap for use in relation to some pulping processes.

Figure 3A:
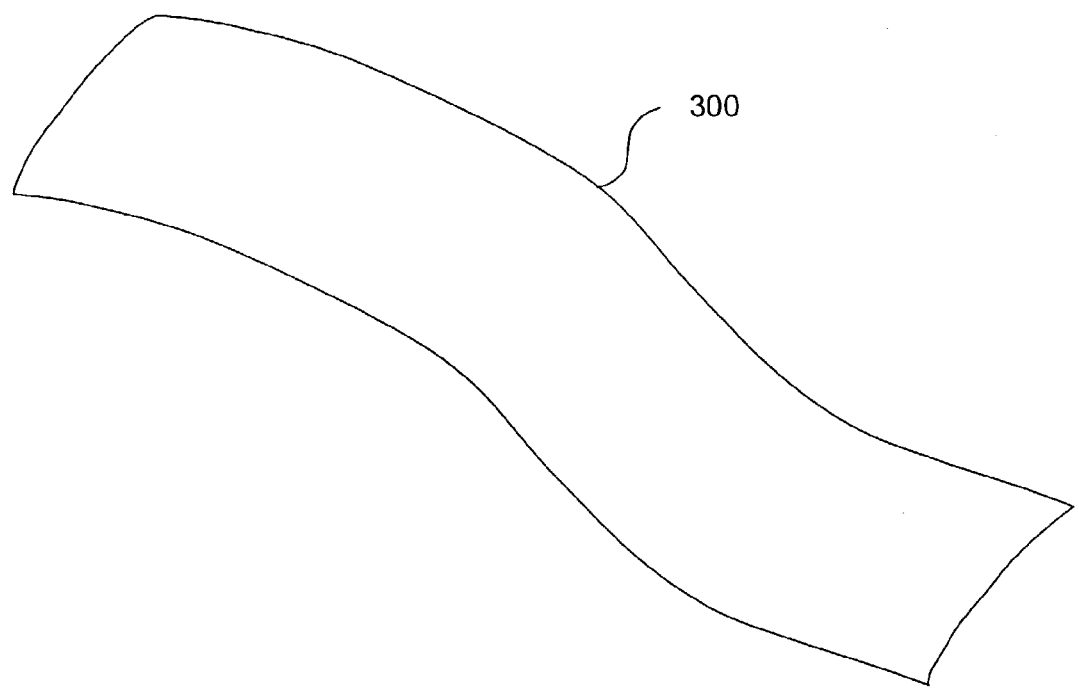
FIGS. 3a–3b illustrate yet another paper strap in accordance with embodiments of the present invention.
Figure 3B:
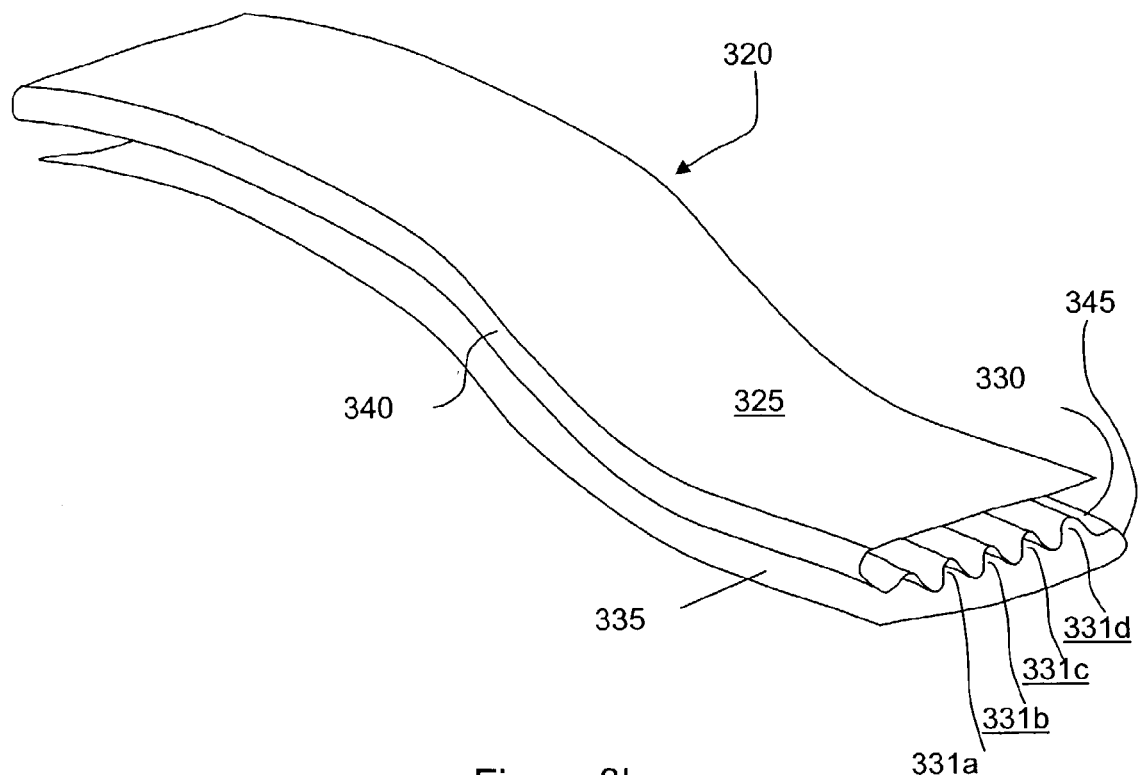

Referring to FIGS. 3a–3b, an alternative folded paper strap 320 is illustrated in accordance with various embodiments of the present invention. Paper strap 320 is formed of one or more paper strips 300 that are layered, or folded, one onto another. Again, in some cases, each of the layers are of substantially equal width, while in other cases, the layers are of differing widths. For example, the outer most layers may be wider than any inner layers, such that the outer layers fold around and encompass the inner layers. As illustrated in FIG. 3b, paper strip 300 is twice folded over to create portions 325, 330, and 335. Paper strips 300 can be formed of paper, or of pulp. Again, for example, where folded paper strap 220 is destined to band pulp bales, it is of some advantage to user paper strips 300 that are formed of the same pulp that will be banded. This facilitates the pulping process where paper strap 320 and a pulp bale that binds it are both introduced into a common pulping vat. In various embodiments, folded paper strap 320 is formed of one-hundred percent virgin fiber. Such an approach allows for paper products that include reduced portions of folded paper straps 320 to gain approval by the food and drug administrations of various countries for use in human products, such as feminine hygiene products.

In addition, one or more of portions 325, 330, 335 are rippled as depicted by ripples 331. The stack of portions 325, 330, 335, including rippled portions, forms the compound structure of the paper body of folded strap 320. Such rippling adds additional mass, and strength to folded paper strap 320. Portions 325 and 330 are attached by fold area 340, and portions 330 and 335 are attached by fold area 245. In some instances, an adhesive can be placed between fold portions 325, 330, 335 to attach the associated portions. Further, in some embodiments, folded paper strap 320 is formed of distinct portions 325, 330, 335 that are not attached by fold areas 340, 345. Based on the disclosure provided herein, one of ordinary skill in the art will recognize that any number of portions 325, 330, 335 can be used where additional, or reduced strength of paper strap 320 is desired. Such a process can be used to form folded paper straps with a thickness of hundredths of millimeters to three millimeters or more. Again, it is conceivable that a strap could be of any thickness desired.

Folded paper strap 320 can be formed of biodegradable and/or repulpable materials. Thus, for example, paper strip 300, and the adhesive(s) used to attach portions 325, 330, 335 can be biodegradable and/or repulpable. Again, in some cases, the adhesive(s) used are water-soluble.

In one particular embodiment, folded strap 320 is formed in part by folding over portions 325, 335 and rippling center portion 330, and adding additional layer thereto. Thus, for example, two or more folded paper straps 320 as illustrated can be stacked one upon another with an adhesive between to form the compound structure of the paper body.

Similar to the discussion provided in relation to folded paper strap 220, folded paper strap 320 can be more advantageous than the previously described stringed paper strap 150. For similar reasons, folded paper strap 320 can more readily break down in the paper manufacturing process, and thus may be more advantageous to such a process. As a further advantage, in some cases, the rippling exposes increased surface area to liquids used in both pulping and recycling processes.

Although not depicted, the outer surfaces of stringed paper strap 150, 170, 220, 320 can also be rippled, or ribbed. Such rippling increases stiffness that aids in loading and/or feeding the paper strap into tracks of a roll severing machine and/or a strapping machine as further described in U.S. Pat. No. 6,363,689. The valleys of the outer surface ripples will hold more adhesive than a flat outer surface. This will create a welding effect and increase the strength of any link.

Again, while not depicted, a variety of other enhancements to a paper strap are possible in accordance with embodiments of the present invention. For example, a dimple or knurling design can be used. This can be used with any of the previously described paper straps 150, 170, 220, 320. In such a design, an embossing pattern is applied to an exposed surface of a paper strap similar to the shell of a golf ball. The frequency pattern and the size of the dimple will offer the ability to control the amount of adhesive applied on the outer surfaces of a paper strap. Being able to vary the dimple size and frequency will offer flexibility in adhesive types. Adhesive application can be metered to optimize link strength. Excessive or insufficient adhesive can be detrimental to the strength of the strap link or in some cases may cause the sealing mechanisms to become inoperable or inefficient.

As another example, a needlepoint design can be used. Again, this can be used with any of the previously described paper straps 150, 170, 220, 320. This design places small needlepoint type holes in the strap without significantly compromising the tensile strength of the paper strap. The advantage of this design is that it allows another avenue for liquids to penetrate the interior of the strap, and thus speed up the breakdown process when a liquid, such as water is introduced. The frequency, pattern, and size of the holes can be determined based on paper type, desired tensile strength, desired break down rate, number of paper layers, and adhesive type.

Figure 4:
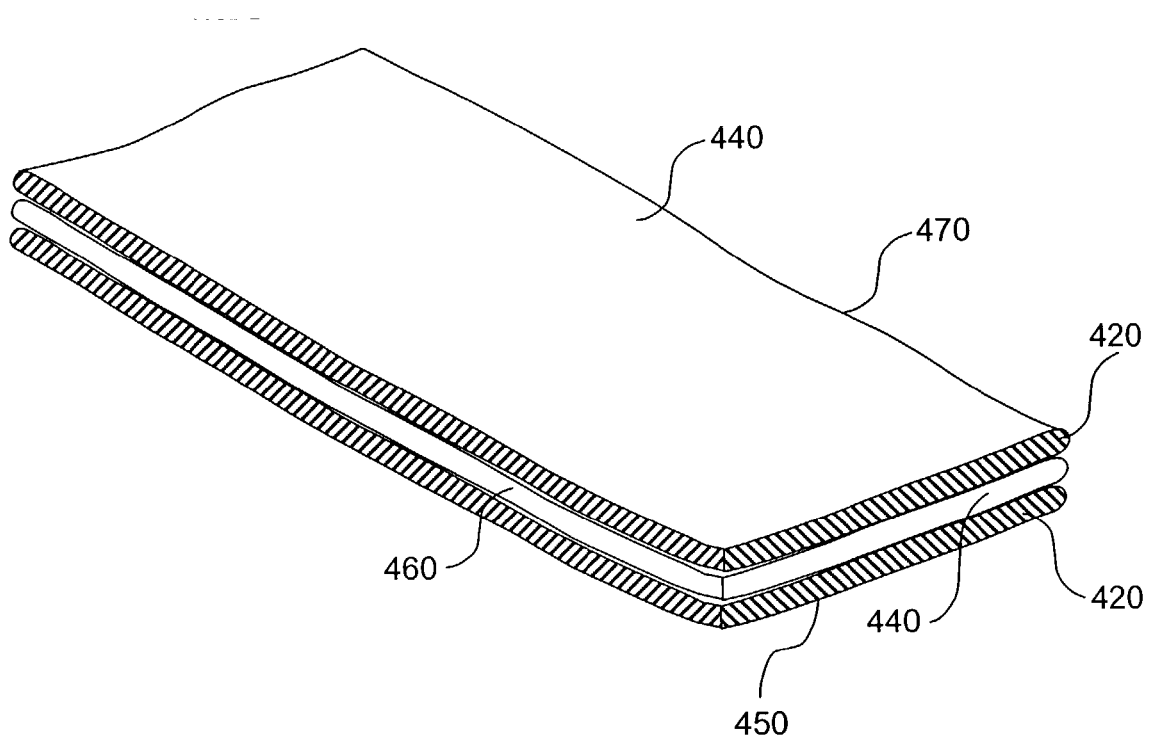
FIG. 4 illustrates the paper straps of FIGS. 1 through 3 after application of an adhesive material in accordance with embodiments of the present invention.

Turning now to FIG. 4, in some embodiments of the present invention, a paper strap 410 is covered by an adhesive material 420. After the adhesive is applied, it is dried. The drying process can include, but is not limited to, air flotation, confection, infrared, gas, oven, and/or ultra violet. The type of drying can be predicated on the line speed and spooling requirements. In some cases more than one type of drying may be applied in combination. The dried paper fiber web(s) can then be slit and/or folded to the desired width and wound onto a spool for packaging. Spool sizes will vary depending on application.

Paper strap 410 can be, for example, stringed and folded paper strap 170, folded paper strap 220, folded paper strap 320, or the like. Adhesive material 420 is added to make paper strap 410 more easily used in a variety of processes. Adhesive 420 can be applied to a top surface 440 of paper strap 410, a bottom surface 450 of paper strap 410, side surfaces 460 of paper strap 410, or any combination thereof. Such adhesives are known by those of ordinary skill in the art. In some cases, where recyclability or repulpability are concerns, an adhesive that can-be broken down in a particular process can be selected. Again, one of ordinary skill in the art will be apprised of the various adhesive properties that make a particular adhesive amenable to a particular process. Adhesive 420 can be applied via bathing paper strap 410 in a vat of such adhesive, or by using an applicator to apply adhesive 420 to paper strap 410.

In some cases, adhesive 420 is a water-soluble material that can be activated, or reactivated through the application of heat, moisture, pressure, or a combination thereof at a strapping location. Such a pre-coated adhesive activation approach is clean, and involves only minimal clean-up and/or maintenance when compared to hot melts or similar liquid or spray adhesives. Such post applied adhesive processes can cause build-up on a sealing head of a strapping station, and tend to drip or spray on other mechanisms causing a need to shut down the mechanisms for maintenance and/or cleaning.

Yet further, the time required to adhere portions of a paper strap pre-coated with adhesive can be reduced in comparison to post applied adhesive. Many automated strapping processes require a strap to be applied an average of every ten seconds. Some strap configurations would require two straps to be applied with an interim time of less than four seconds. In many cases this would not be enough time to add the adhesive, press the overlapping strap and wait for it to set prior to moving the strapped item.

Figure 5A:
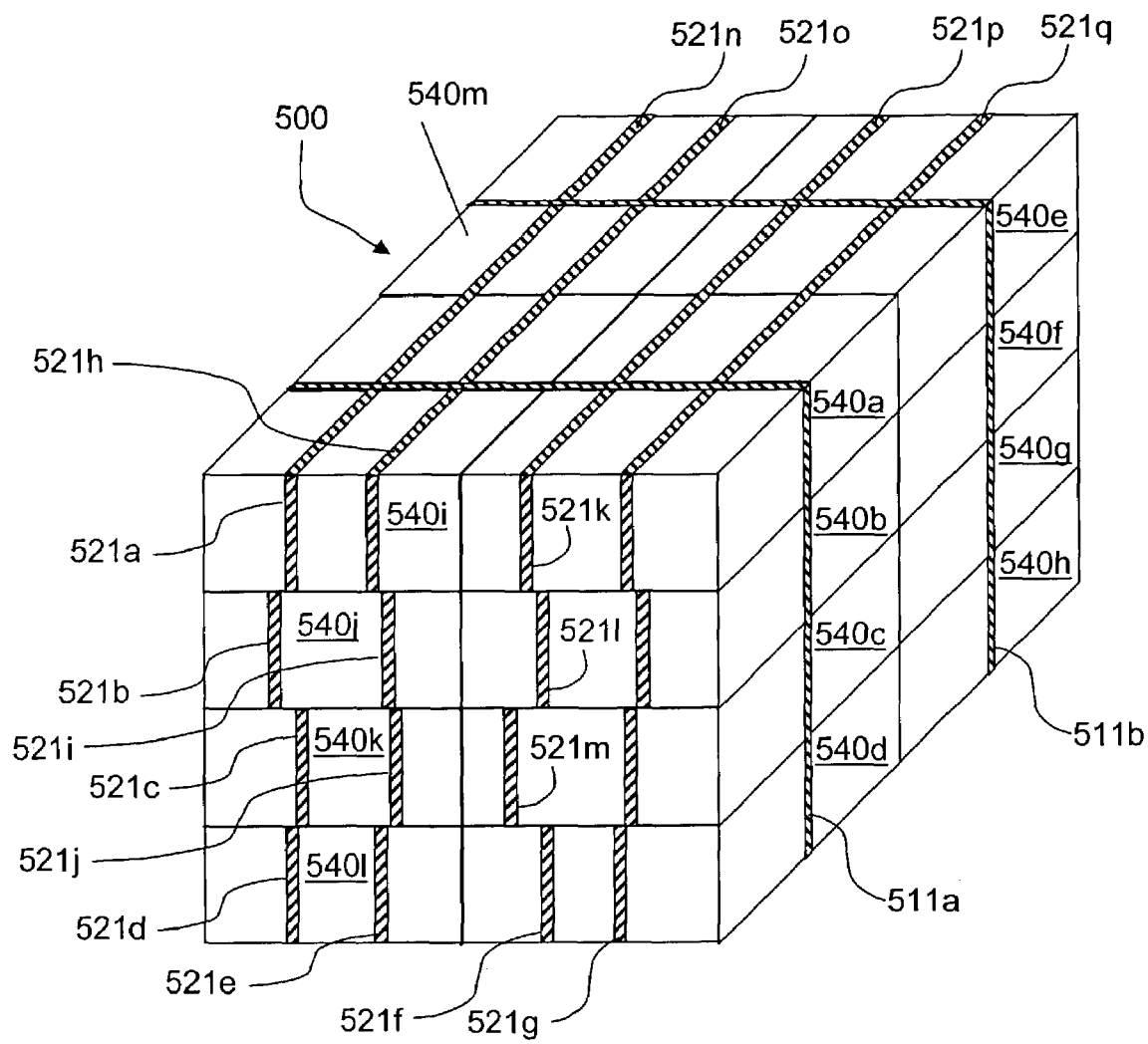
FIGS. 5a–5b illustrate a method for using the paper straps of FIGS. 1 through 4 in accordance with embodiments of the present invention.

One use of paper straps according to the present invention in relation to the manufacture of paper is depicted in FIG. 5a. FIG. 5a depicts a group of pulp bales 500 that includes a number of pulp bales 540 that are each individually banded using paper straps 521. Paper straps 521 can be paper straps as previously described. Then, pulp bales 540 are joined in a group by straps 511. In one particular case, straps 511 are plastic or metal straps that must be removed prior to introducing group 500 into the pulping process. Alternatively, where straps 511 are paper based straps, they can be removed before introducing group 500 to the pulping process, or left in placed and processed into paper products. By using paper strap 521 that can be reduced in the pulping process, group 500 can be introduced to a pulping vat without requiring preparation, or only minimal preparation.

Figure 5B:
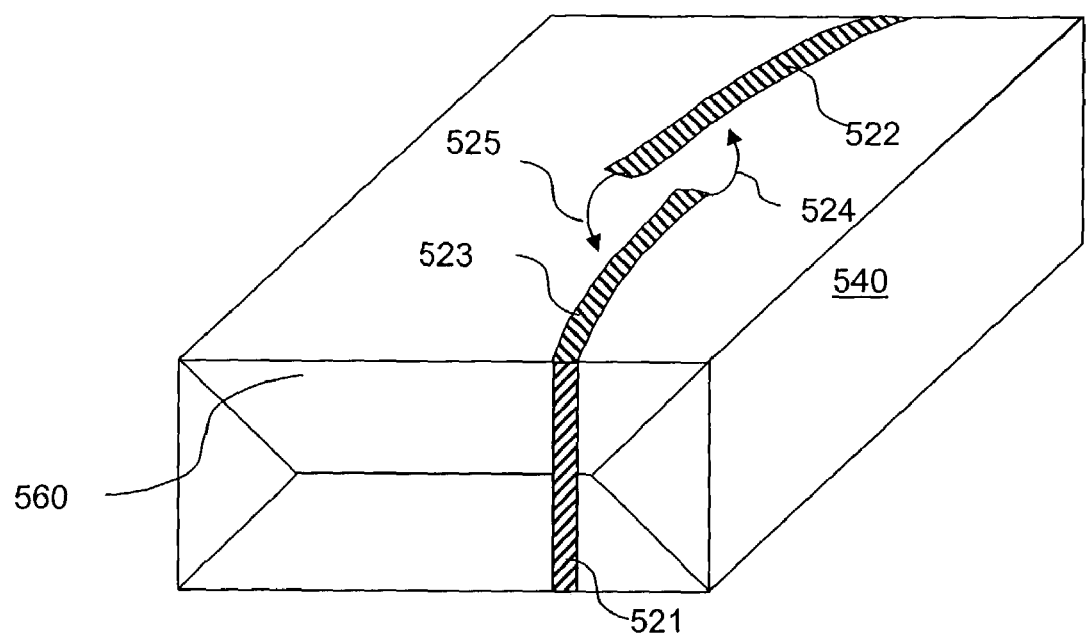
Figure 5B:

Referring to FIG. 5b, the process of banding a pulp bale 540 is depicted. Pulp bale 540 is covered by an outer pulp covering 560. Then paper strap 521 is wrapped around pulp bale 540. An upper surface 523 of one end of paper strap 521 is brought into contact with a lower surface 522 of paper strap 521 as indicated by arrows 523, 524. An activator 570 is then applied a the point of contact between the two ends of paper strap 521. Activators can be, for example, a heat activator 570c, a pressure activator 570a, and/or a moisture activator 570b. Upon application of activator 570, the adhesive material pre-coated on paper bad 521 is activated, or reactivated, and the two ends of paper strap 521 are attached to one another. Based on the disclosure provided herein, one of ordinary skill in the art will recognize that the process illustrated in FIG. 5b is also applicable to a number of other circumstances. For example, one of ordinary skill in the art will recognize that the process is applicable to sealing cartons that can include, but are not limited to, card board boxes.

Figure 6:
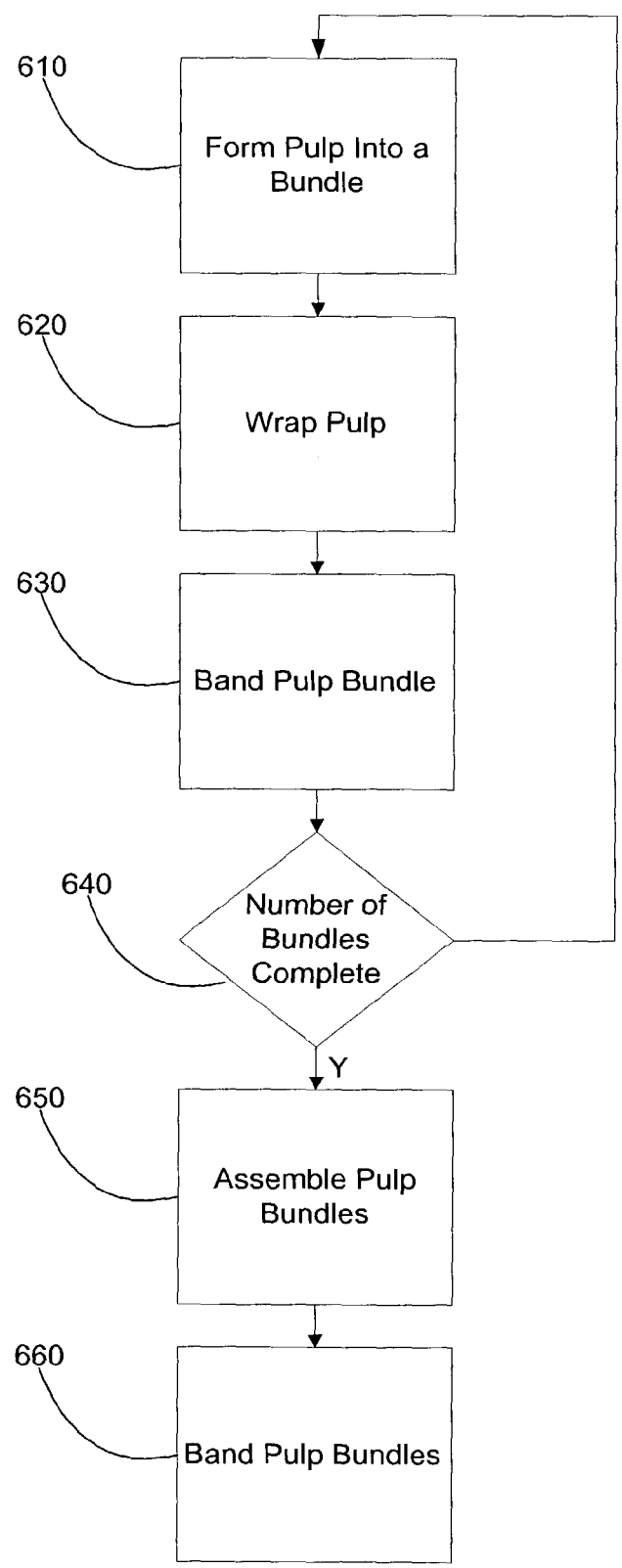
FIG. 6 illustrates a method for using the paper straps of FIGS. 1 through 4 in accordance with embodiments of the present invention.

Referring now to FIG. 6, a flow diagram 600 depicts a method for forming group 500 in accordance with various embodiments of the present invention. Following flow diagram 600, pulp is formed into a bundle such as that included in pulp bale 540 (block 610). In some cases, a pulp bundle is formed of hundreds, or even thousands of sheets of pulp. The pulp bundle is wrapped with a piece of pulp, previously depicted as outer pulp covering 560 (block 620). The pulp bundle, or pulp bale, is then banded as discussed in relation to FIG. 5b (block 630). It is then determined if the number of bundles within group 500 are complete (block 640). Where the number is not complete, the processes of blocks 610 through 630 are repeated until the number is complete. Alternatively, where the number is complete (block 640), the pulp bundles 540 are assembled to form group 500 (block 650). Then, the assembled pulp bundles are banded together similar to that discussed in relation to FIG. 5b above.

Figure 7:
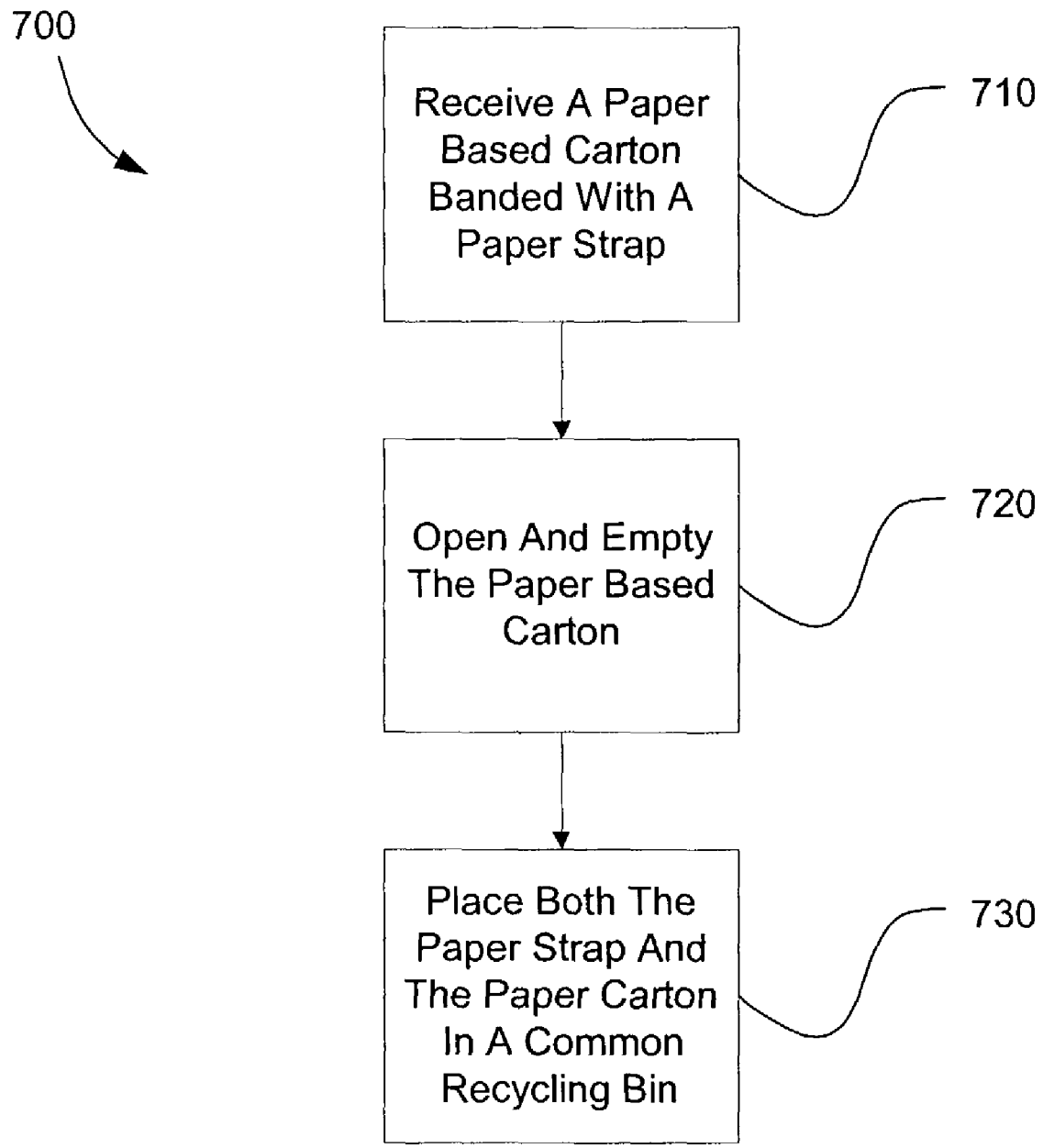
FIG. 7 illustrates another method for using the paper straps of FIGS. 1 through 4 in accordance with other embodiments of the present invention.

Turning to FIG. 7, a flow diagram 700 illustrates a method for recycling paper based cartons banded with paper straps in accordance with the present invention. Following flow diagram 700, a paper based carton banded with a paper strap is received (block 710). The strap is removed and the carton opened and emptied (block 720). At that point, both the strap and the carton are discarded in the same recycling bin (block 730).

Based on the disclosure provided herein, one of ordinary skill in the art will recognize a variety of advantages associated with the use of paper straps in accordance with the present invention. For example, a paper strap is significantly safer than metal bands, high tensile wire, or plastic strapping that often flips off when severed. This uncontrolled movement of the severed strap commonly causes soft tissue injuries to people in the vicinity of the severed strap. Indeed, in some manual removal operations, special safety equipment is required. Such equipment is not needed where a paper strap is used. Furthermore, a paper fiber based strap also offers retained tension as a safety consideration. Due to its minimal elasticity it is less susceptible to stretching, like plastic does. Thus, for example, the amount of shift occurring during shipment of palletized items can be reduced. This reduces the possibility of items becoming loose and falling due to stretching.

As another example, paper straps in accordance with the present invention can be non-contaminating. A paper strap formed of paper and water-soluble adhesive(s) does not contaminate recycled paper processes, or virgin paper production processes. Indeed, the paper strap adds to the volume of virgin or recycled paper created. Elimination of the need to remove strapping material prior to processing saves both time and money, regardless of whether the strapping removal would have been automated or manual.

As yet another example, paper fiber straps are easily formed to meet tensile strength and/or repulpability requirements. The basis weight of the paper and number of layers will allow a strap to be customized to meet strength requirements. The hydrolysis characteristics of the water-soluble adhesive will allow the strap to be customized to meet repulpability requirements. Folded straps, including layered straps where the edges of the layers are not connected, offer an increased speed in strap breakdown (repulpability). As liquids, such as water, used in the manufacture of paper products is introduced to the strap it follows the path of least resistance. In this case liquids will be allowed to easily penetrate the soluble adhesive(s) and carry the adhesive(s) away from the paper body. This allows the remaining paper to be completely engulfed with liquid, thus enhancing breakdown. The layered strap will have thin layers of water-soluble adhesive in between the paper that are exposed at all edges and will easily breakdown when submerged in liquids. The more edges that are exposed the quicker the liquids can penetrate to the inner portion of the paper strap.

Further examples include uses facilitated by the adhesive (s) formed on the outer surface(s) of a paper strap. Coating and drying the outer surfaces with adhesive during manufacturing of the strap will allow the adhesive to be re-activated for linking by introducing moisture and/or heat to the overlapping areas for sealing. This is a much cleaner and efficient approach than applying the adhesive at the time of banding.

Several different strap types can be assembled using the same basic manufacturing process. The ultimate use of the strap can determine the final assembly requirements. Some straps may require more tensile strength with less repulpability, while others may require greater repulpability with less tensile strength. A ribbed paper strap may also be used to add stiffness, as required, for feeding purposes. A flat paper and/or a dimpled pattern may also be used. In any case the two primary components will be paper fibers with various basis weights and water-soluble adhesive with various degrees of hydrolysis.

Further, based on the disclosure provided herein, one of ordinary skill in the art will recognize a multitude of uses to which paper straps in accordance with the present invention can be applied. For example, paper straps in accordance with the present invention can be used in any industry that is currently utilizing a metal, plastic or paper strap for packaging. Any industry, such as pulp or recycle paper baling where the end user is not going to have to remove the strap offers additional applicability. Other possible industries include, but are not limited to, corrugated box securing used in relation to grocery stores or other retail establishments, cotton baling, tobacco baling, tree root tying, and the like.

Figure 8A:
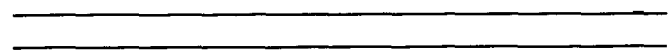
FIGS. 8a–8k illustrate various compound structures in accordance with embodiments of the present invention.
Figure 8B:
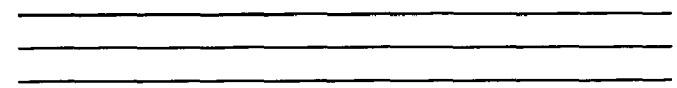
Figure 8C:
Figure 8D:
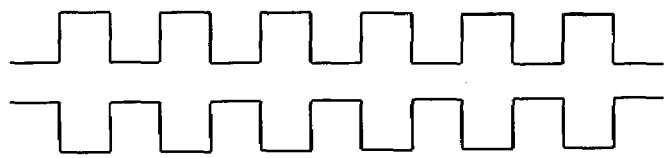
Figure 8E:
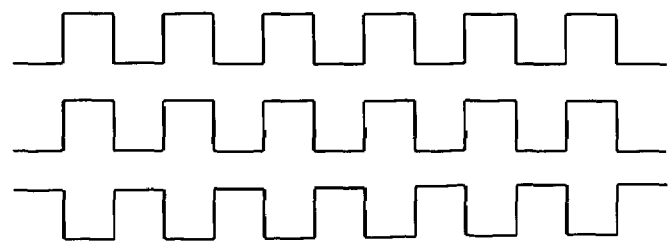

Referring to FIGS. 8a–8k, various alternative compound structures are illustrated in accordance with various embodiments of the present invention. As illustrated in FIGS. 8a and 8b, compound structures may have two or three flat folds or flat layers. Further, based on this disclosure, one with ordinary skill in the art will appreciate that there can be four or more folds or layers in this type of compound structure. FIG. 8c illustrates a compound structure with a continuous rippled or corrugated layer. Similarly, FIGS. 8d and 8e illustrate compound structures with two or three continuous rippled or corrugated layers. Again, based on this disclosure, one with ordinary skill in the art will appreciate that there can be four or more folds or layers in this type of compound structure. As previously alluded to, with the outer surface of a compound structure rippled, additional adhesive material is available to adhere a strap to another body, such as the other endo of the strap. As will be appreciated, the desired strength of a bond is used to determine the combination of adhesive and rippling needed.

Figure 8F:
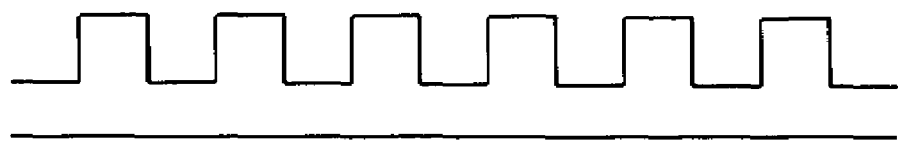
Figure 8G:
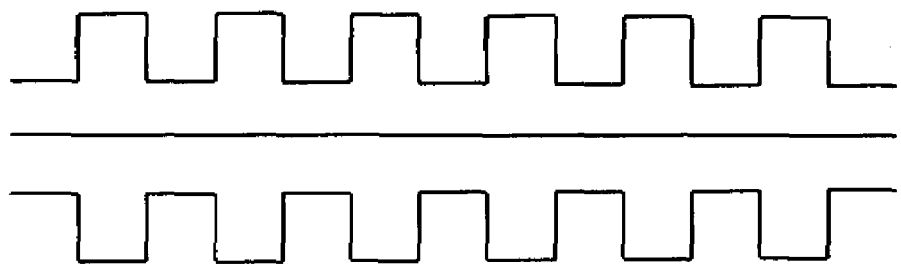
Figure 8H:
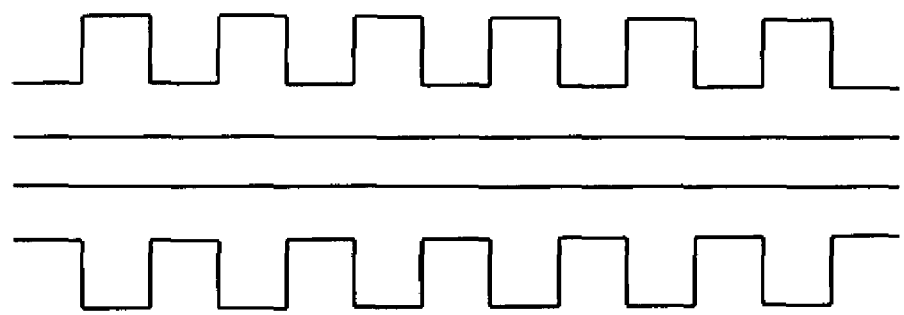

FIGS. 8f–8h illustrate compound structures with one or more continuous rippled or corrugated layers combined with one or more flat layers. More specifically, FIG. 8f illustrates a compound structure with one continuous rippled layer with one flat layer. Based on this disclosure, one with ordinary skill in the art will appreciate that the layers can be interchanged. FIG. 8g illustrates a compound structure with one flat layer in between two corrugated layers, while FIG. 8h illustrates a compound structure with two flat layers in between two corrugated layers. Again, one with ordinary skill in the art will appreciate that there can be three or more flat folds or layers in this type of compound structure.

Figure 8I:
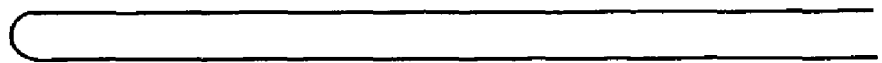
Figure 8J:
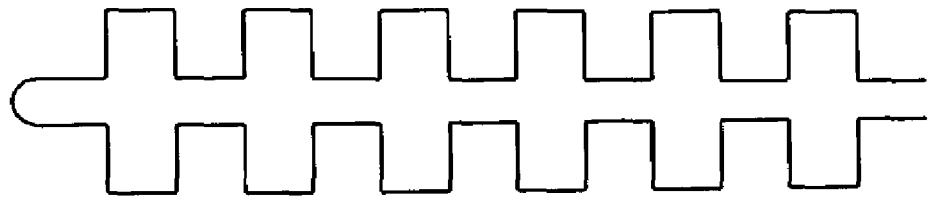
Figure 8K:
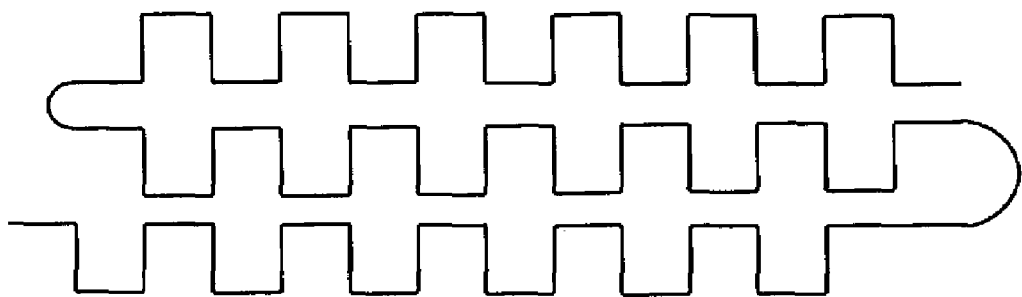

FIGS. 8i–8k illustrate compound structures that are layered using a continuous fold, as compared with the non-continuous fold exemplified by, for example, FIG. 8b. More specifically, FIG. 8i illustrates a compound structure with a folded flat layer. FIGS. 8j and 8k illustrate compound structures with folded continuous rippled layers. As before, one with ordinary skill in the art will appreciate that there can be three or more folds and four or more layers in this type of compound structure.

Figure 9A:
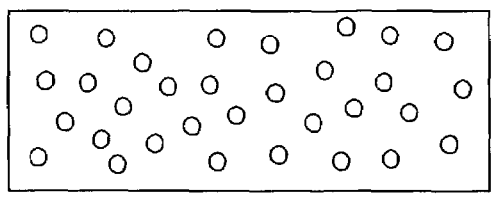
FIGS. 9a–9b illustrate embossing patterns formed on the surface of straps in accordance with embodiments of the present invention.
Figure 9B:
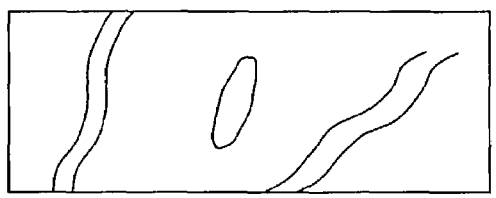

Referring to FIG. 9, various dimpling, knurling, and/or embossing approaches are illustrated in accordance with various embodiments of the present invention. FIG. 9a illustrates a compound structure, such as those illustrated in FIG. 8, that has surface dimples in the paper strap. Similarly, FIG. 9b illustrates a compound structure that has non-continuous embossed patterns in the paper strap. The dimples and the embossed patterns aid in the adhesion of the paper strap because the dimples and the embossed patterns hold an additional amount of adhesive, which form a stronger bond in the paper strap.

Figure 10:
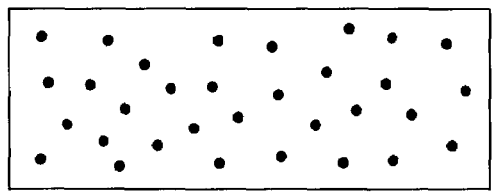
FIG. 10 illustrates needling the body of a strap in accordance with embodiments of the present invention.

Referring to FIG. 10, a needling approach is illustrated in accordance with various embodiments of the present invention. As illustrated in FIG. 10, holes, or needle points, are formed through, or partially through a compound structure, such as, those illustrated in FIG. 8 and stringed paper strap 150, among others. In a particular embodiment of the present invention, the diameter of these needle points can be between 0.1 millimeters and one millimeter depending on the rate of breakdown desired, and the tensile strength of the strap that is desired. The holes in the paper strap increase the surface area of the paper strap that can be exposed to liquids, and thus provide a faster breakdown capability of the paper strap. The needlepoint compound structures may be produced in two alternative forms. In the first form, the adhesive is added to the paper strap and allowed to dry. Subsequently, the holes are formed. This allows for liquids to contact the surface of the paper strap prior to the breakdown of the adhesive. In the second form, the holes are punched out of the paper strap first, and then the adhesive is added. The adhesive can then be filled into the holes, thus increasing the tensile strength of the paper strap. In some cases, an adhesive that breaks down more quickly than the paper forming the strap is used. When processed, the adhesive breaks down, allowing the processing liquids to contact the surface of the paper at the needle points.

Figure 11A:
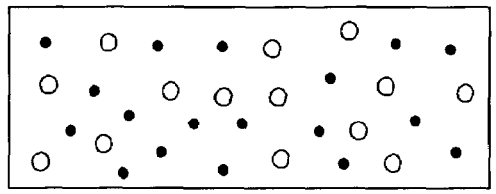
FIGS. 11a–11b illustrate a combination of the needling of FIG. 10 and the embossing of FIG. 11.
Figure 11B:
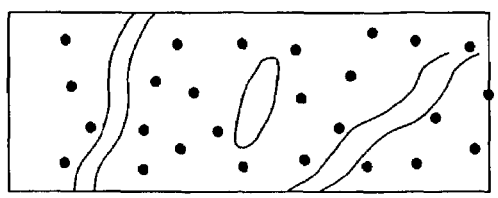

Referring to FIGS. 11, hybrid structures including both dimpling (knurled or embossed also) and needle pointing is illustrated. Such an approach is applicable to, for example, the compound structures illustrated in FIG. 8. As illustrated in FIG. 1a, the dimples as shown in FIG. 9a can be combined with the needlepoint compound structure, as shown in FIG. 10, to form a hybrid of the two compound structure. This hybrid combines the added adhesive strength of the dimpled compound structure with the advanced breakdown capability of the needlepoint compound structure. Likewise, as illustrated in FIG. 11b, the non-continuous embossed patterns as shown in FIG. 9b can be combined with the needlepoint compound structure, as shown in FIG. 10, to form a hybrid. This hybrid also combines the added adhesive strength of the non-continuous embossed pattern compound structure with the advanced breakdown capability of the needlepoint compound structure.

Consistent with FIGS. 2a, 2b, 3a, 3b, 4, 5a and 5b and as is known by one of ordinary skill in the art, a strap includes a body that has ends, a top and a bottom surface, and sides. The top surface is of a width and the bottom surface is of a width, the top and the bottom surface are separated by a thickness, and the top surface and the bottom surface extend between the ends. As can be seen, the width is greater than the thickness and the length is substantially greater than the width. Using FIG. 2b as an example, the top surface extends along a portion designated as 225, and a bottom surface extends along a portion designated as 235. Two sides extend along portions around the areas designated as 240 and 245 between the top and bottom surfaces. In addition, two ends extend between the aforementioned sides and top and bottom surfaces with one of the ends at the area where designator 230 is placed and the other occurring opposite of the aforementioned end. In some cases as shown in the cross sectional end drawings of FIGS. 8a–8h, straps with two or more layers are possible. In the layered cases, the sides of such straps are open such that the intervening adhesive material is exposed. As liquid, such as water, is introduced to such straps the liquid follows the path of least resistance.

In this case, liquid will be allowed to easily penetrate the soluble adhesive(s) and carry the adhesive(s) away from the paper body. This allows the remaining paper to be completely engulfed with liquid, thus enhancing breakdown. The layered strap will have thin layers of liquid-soluble adhesive in between the paper that is exposed at all edges and will easily break down when submerged in liquid. The more edges that are exposed, the quicker the liquids can penetrate to the inner portion of the paper strap.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A paper strap, the paper strap comprising:
   a paper strap including a paper body, wherein the paper body is formed as an elongated band having a first end, a second end, a top surface, a bottom surface, a first side and a second side; wherein the top surface and the bottom surface are of a width; wherein the top surface and the bottom surface are separated by a thickness; wherein the top surface and the bottom surface extend a length between the first end and the second end; wherein the first side and the second side extend between the top surface and the bottom surface; wherein the width is greater than the thickness; wherein the length is substantially greater than the width; wherein the paper body includes at least a first layer, a second layer, and an adhesive layer connecting the tirst layer and the second layer; and
   wherein an edge of the adhesive layer along both of the first side and the second side of the paper body is exposed.

2. The paper strap of claim 1, wherein the paper body consists essentially of virgin fiber.

3. The paper strap of claim 1, wherein the paper body is pulpable.

4. The paper strap of claim 1, wherein the paper body exhibits liquid resistance less than that of a stringed paper strap.

5. The paper strap of claim 1, wherein the adhesive layer is formed of an adhesive material that is activated by an activator selected from a group consisting of: heat activation, pressure activation, liquid activation.

6. The paper strap of claim 1, wherein the adhesive material is pulpable.

7. The paper strap of claim 1, wherein at least one of the top surface and the bottom surface of the paper body is knurled.

8. A paper strap, the paper strap comprising:
   a paper strap including a paper body, wherein the paper body comprises needled areas to increase exposed surfase area, wherein the paper body is formed as an enlongted band having a first en, a second end, a top surface, a bottom surface, a first side and a second side; wherein the top surface and the bottom surface are of a width; wherein the top surface and the bottom surface are separated by a thickness; wherein the top surface and the bottom surface extend a length between the first end and the second end; wherein the first side and the second side extend between the top surface and the bottom surface; wherein the width is greater than the thickness; wherein the length is substantially greater than the width wherein the paper body includes at least a first layer, and a second layer connected by an adhesive material disposed between the first layer and the second layer; and wherein the needled areas include one or more holes formed through one or more of the first layer and the second layer; and wherein an edge of the adhesive material along both of the first side and the second side of the paper body is exposed.

9. The paper strap of claim 8, wherein the paper strap further comprises:

the adhesive material formed on at least a portion of an exposed surface the paper body.

10. The paper strap of claim 8, wherein the paper strap further comprises:

the adhesive material formed on at least a portion of an exposed surface of the paper body, wherein the adhesive material is formed after the needled areas are formed such that at least some of the needled areas are at least partially covered by the adhesive material.

11. The paper strap of claim 10, wherein the adhesive material exhibits lower liquid resistance than the paper body.

12. The paper strap of claim 8, wherein the paper strap further comprises:

the adhesive material formed on at least a portion of an exposed surface of the paper body, wherein the adhesive material is formed before the needled areas are formed.

13. A paper strap, the paper swap comprising:

a paper strap including a paper body, wherein the paper body has a first end and a second end, wherein the paper body has a top surface and a bottom surface extending between the first end and the second end, wherein the paper body has a first side and a second side extending between the lop surface and the bottom surface, wherein at least one of the top surface and the bottom surface is substantially planar across an area extending from the first side to the second side, wherein a width at the first end of the paper body is substantially less than a length between the first end and the second end, wherein a thickness between the top surface and the bottom surface is less than the width, and wherein the paper body includes at least a first layer and a second layer;

an adhesive material formed between at least the first layer and the second layer; and wherein the adhesive material is exposed along both of the first side and the second side.

14. The paper strap of claim 13, wherein the paper body further includes a needled area, wherein the needled area includes one or more holes formed through one or more of the first layer and the second layer.

15. The paper strap of claim 14, wherein the paper body is pulpable, and wherein the adhesive is pulpable.

16. The paper strap of claim 14, wherein the adhesive material exhibits lower liquid resistance than the paper body.

17. A paper strap, the paper strap comprising:

a paper strap including a paper body, wherein the paper body has a first end and a second end, wherein the paper body has a top surface and a bottom surface extending between the first end and the second end, wherein the paper body has a first side and a second side extending a length between the top surface and the bottom surface, wherein a width at the first end of the paper body is substantially less than the length between the first end and the second end, wherein a thickness between the top surface and the bottom surface is less than the width, wherein the paper body includes at least a first layer and a second layer, wherein the paper body includes an indent pattern, and wherein the indent pattern is selected from a group consisting of: a needled area, a knurled area, an embossed area, and a dimpled area;

an adhesive material formed on at least a portion of the paper body; and wherein the adhesive material is exposed continuously along both of the first side and the second side between the first layer and the second layer.

18. The paper strap of claim 17, wherein the adhesive material exhibits lower liquid resistance than the paper body.

19. The paper strap of claim 17, wherein the paper body is pulpable, and wherein the adhesive is pulpable.

20. A compound paper strap, wherein the compound paper strap comprises:

a paper strap including a paper body, wherein the paper body includes an indent, pattern and is formed in a compound structure, wherein the paper body has a first end and a second end, and wherein a width at the first end of the paper body is substantially less than a length between the first end and the second end, and wherein the paper body includes at least a first layer and a second layer, wherein the indent pattern is selected from a group consisting of: a needled area, a knurled area, an embossed area, and a dimpled area; and an adhesive material formed between the first layer and the second layer, and on an outer portion of the paper body, wherein the adhesive material is exposed along both sides extending the length between the first end and the second end.

21. The paper strap of claim 20, wherein the indent pattern is a hybrid indent pattern.

22. The paper strap of claim 20, wherein the adhesive material exhibits lower liquid resistance than the paper body.

* * * * *